(12) United States Patent
Machovina et al.

(10) Patent No.: US 8,973,855 B2
(45) Date of Patent: Mar. 10, 2015

(54) FOOD BASED HOMOGENIZER

(71) Applicant: Healthy Foods, LLC, Cleveland, OH (US)

(72) Inventors: Brian Louis Machovina, Coral Gables, FL (US); Robert Johnson, Montville, OH (US); Robert Schmidt, Painesville, OH (US); Winston Breeden, III, Chagrin Falls, OH (US); Douglas Edward Whitner, Chagrin Falls, OH (US); Eileen McHale, Coral Gables, FL (US)

(73) Assignee: Healthy Foods, LLC, Cleveland, OH (US)

( * ) Notice: Subject to any disclaimer, the term of this patent is extended or adjusted under 35 U.S.C. 154(b) by 0 days.

(21) Appl. No.: 14/136,030

(22) Filed: Dec. 20, 2013

(65) Prior Publication Data

US 2014/0117132 A1    May 1, 2014

Related U.S. Application Data

(60) Continuation of application No. 14/023,944, filed on Sep. 11, 2013, now Pat. No. 8,925,845, which is a division of application No. 13/108,112, filed on May 16, 2011, now Pat. No. 8,550,390.

(60) Provisional application No. 61/378,662, filed on Aug. 31, 2010, provisional application No. 61/440,939, filed on Feb. 9, 2011.

(51) Int. Cl.
| | |
|---|---|
| *B02C 7/04* | (2006.01) |
| *A47J 43/07* | (2006.01) |
| *A47J 43/046* | (2006.01) |
| *A47J 43/08* | (2006.01) |

(52) U.S. Cl.
CPC ............. *A47J 43/07* (2013.01); *A47J 43/046* (2013.01); *A47J 43/0722* (2013.01); *A47J 43/085* (2013.01)
USPC ..................................... 241/261.1; 241/285.1

(58) Field of Classification Search
USPC ...................... 241/361.1, 261.2, 285.1, 261.1
See application file for complete search history.

(56) References Cited

U.S. PATENT DOCUMENTS

| | | |
|---|---|---|
| 1,727,410 A | 9/1929 | Poesse |
| 2,228,025 A | 1/1941 | Apfelbeck |

(Continued)

FOREIGN PATENT DOCUMENTS

| | | |
|---|---|---|
| CH | 333127 | 11/1958 |
| EP | 1475024 A1 | 11/2004 |

(Continued)

OTHER PUBLICATIONS

International Search Report dated Mar. 20, 2012.

(Continued)

*Primary Examiner* — Faye Francis
(74) *Attorney, Agent, or Firm* — Cooper Legal Group, LLC

(57) ABSTRACT

A food homogenizer is provided, including a base with a driving motor and a homogenizer assembly removably coupled to the base. The homogenizer assembly includes a homogenizing chamber, an inlet chute, and an exit spout. A shredder is disposed within the homogenizing chamber and is driven by the driving motor to homogenize food ingredients into a soft texture with a similar consistency as ice cream or sherbet.

20 Claims, 11 Drawing Sheets

(56) References Cited

U.S. PATENT DOCUMENTS

| | | | |
|---|---|---|---|
| 2,567,371 A | 9/1951 | Forkey et al. | |
| 2,649,317 A | 8/1953 | Leuze | |
| 2,840,130 A | 6/1958 | Schwarz | |
| 3,249,310 A | 5/1966 | Willems | |
| 3,514,079 A | 5/1970 | Little, Jr. | |
| 3,933,317 A | 1/1976 | Rovere | |
| 3,952,958 A * | 4/1976 | Rich | 241/162 |
| 3,976,001 A | 8/1976 | Trovinger | |
| 4,081,145 A | 3/1978 | Moe et al. | |
| 4,095,751 A | 6/1978 | Artin | |
| 4,227,656 A | 10/1980 | Engebretsen | |
| 4,311,315 A | 1/1982 | Kronenberg | |
| 4,387,860 A | 6/1983 | Necas et al. | |
| 4,390,133 A | 6/1983 | Wanat | |
| 4,700,903 A | 10/1987 | Henn | |
| 4,844,362 A | 7/1989 | Revnivtsev et al. | |
| 4,856,718 A | 8/1989 | Gaber et al. | |
| 4,884,755 A | 12/1989 | Hedrington | |
| 4,886,218 A * | 12/1989 | Bradley et al. | 241/294 |
| 4,948,614 A | 8/1990 | Feldpausch | |
| 4,955,724 A | 9/1990 | Otto | |
| 5,098,731 A | 3/1992 | Feldpausch | |
| 5,201,529 A | 4/1993 | Heinzen | |
| 5,233,916 A | 8/1993 | Butler et al. | |
| 5,246,175 A | 9/1993 | Feldpausch | |
| 5,289,981 A * | 3/1994 | Kamiwano et al. | 241/261.1 |
| 5,297,475 A | 3/1994 | Borger et al. | |
| 5,495,795 A | 3/1996 | Harrison et al. | |
| 5,584,577 A | 12/1996 | Thies | |
| 5,613,430 A | 3/1997 | Lee | |
| 5,675,228 A | 10/1997 | O'Bryan | |
| 5,680,997 A | 10/1997 | Hedrington | |
| 5,806,413 A | 9/1998 | Trovinger | |
| 5,836,530 A * | 11/1998 | Pilao | 241/261.1 |
| 5,896,812 A | 4/1999 | Basora et al. | |
| 5,906,154 A | 5/1999 | Yoon et al. | |
| 6,029,568 A | 2/2000 | Pascotti et al. | |
| 6,050,180 A | 4/2000 | Moline | |
| 6,112,649 A | 9/2000 | Jeong | |
| 6,210,033 B1 | 4/2001 | Karkos, Jr. et al. | |
| 6,350,053 B1 | 2/2002 | Morin | |
| 6,394,377 B1 | 5/2002 | Kim et al. | |
| 6,554,466 B1 | 4/2003 | Lee | |
| 6,604,454 B1 | 8/2003 | Tateno | |
| 6,606,939 B1 | 8/2003 | Tateno | |
| 6,637,323 B2 | 10/2003 | Kim | |
| 6,722,268 B2 | 4/2004 | Catelli | |
| 6,748,853 B1 | 6/2004 | Brady et al. | |
| 6,766,731 B1 | 7/2004 | Lavi et al. | |
| 6,814,323 B2 | 11/2004 | Starr et al. | |
| 6,854,382 B2 | 2/2005 | Jan | |
| 6,910,800 B2 | 6/2005 | Wu | |
| 6,968,777 B2 | 11/2005 | Lin | |
| 7,028,607 B2 | 4/2006 | Zweben | |
| 7,036,758 B2 | 5/2006 | Hamada et al. | |
| 7,063,009 B2 | 6/2006 | Lin | |
| 7,080,594 B2 | 7/2006 | Lin | |
| D539,315 S | 3/2007 | Zweben | |
| 7,195,186 B2 * | 3/2007 | Van Mullem | 241/207 |
| 7,217,028 B2 | 5/2007 | Beesley | |
| 7,422,361 B2 | 9/2008 | Pryor, Jr. et al. | |
| 7,665,885 B2 | 2/2010 | Pryor, Jr. | |
| 7,690,592 B2 | 4/2010 | Ferraby | |
| 7,861,958 B2 | 1/2011 | Waznys et al. | |
| 7,900,860 B2 | 3/2011 | Waznys et al. | |
| D682,606 S | 5/2013 | Machovina et al. | |
| 2001/0008258 A1 | 7/2001 | Robordosa et al. | |
| 2002/0012288 A1 | 1/2002 | Masip | |
| 2003/0226923 A1 | 12/2003 | Starr et al. | |
| 2004/0144875 A1 * | 7/2004 | Johansson | 241/261.1 |
| 2006/0029709 A1 | 2/2006 | Zweben | |
| 2006/0065133 A1 | 3/2006 | Moline | |
| 2007/0107609 A1 | 5/2007 | Barker et al. | |
| 2007/0296153 A1 | 12/2007 | Kurth et al. | |
| 2008/0106043 A1 | 5/2008 | Escriva Estruch | |
| 2009/0064875 A1 | 3/2009 | Trovinger | |
| 2009/0272280 A1 | 11/2009 | Cheung et al. | |
| 2009/0309310 A1 | 12/2009 | Wilson | |
| 2010/0058940 A1 | 3/2010 | Rivera | |
| 2010/0282886 A1 | 11/2010 | Pallmann | |
| 2010/0288139 A1 | 11/2010 | Li et al. | |
| 2011/0095115 A1 | 4/2011 | Waznys et al. | |

FOREIGN PATENT DOCUMENTS

| | | |
|---|---|---|
| JP | S59-118116 | 7/1984 |
| JP | 08-019474 | 1/1996 |
| JP | 2010-263849 | 11/2010 |
| KR | 20030089801 A | 11/2003 |
| KR | 100433172 | 5/2004 |
| NZ | 199502 | 12/1984 |
| SU | 1412725 A1 | 7/1988 |
| SU | 1551339 A2 | 3/1990 |
| WO | 2005041732 A1 | 5/2005 |
| WO | 2005079638 A1 | 9/2005 |

OTHER PUBLICATIONS

Australian Office action dated May 29, 2014, 4 pages.
Supplementary European Search Report dated Feb. 20, 2014.

* cited by examiner

FOOD BASED HOMOGENIZER

CROSS-REFERENCE TO RELATED APPLICATIONS

This application claims the benefit and is a continuation of U.S. patent application Ser. No. 14/023,944, filed on Sep. 11, 2013, which is a divisional of U.S. patent application Ser. No. 13/108,112, filed on May 16, 2011, now U.S. Pat. No. 8,550,390, and U.S. Provisional Application Nos. 61/378,662, filed Aug. 31, 2010 and 61/440,939, filed Feb. 9, 2011, the entire disclosures of which are hereby incorporated herein by reference.

FIELD OF THE INVENTION

The present invention relates generally to a food homogenizer that easily enables people, through an easy to operate and easy to clean machine, to make a healthy dessert from frozen fruits, nuts, chocolates, non-frozen foods, and other ingredients.

BACKGROUND OF THE INVENTION

Ice cream, sherbet, and frozen similar frozen desserts are well liked by many people, but the opportunity to easily make frozen desserts at home from healthy ingredients can be a challenge. The present invention generally relates to a food-based homogenizer, more specifically a small counter-top kitchen appliance that is simple to use and easy to clean into which a user inserts frozen fruits, nuts, chocolates, and other ingredients, and which homogenizes the ingredients into a soft texture with a similar consistency as ice cream or sherbet, and then extrudes them through an exit spout directly into the user's bowl for consumption. The present invention is not limited to use with frozen fruits, however, and can be used with a variety of non-frozen foods as well.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, a food homogenizer comprises a base comprising a driving motor with a drive shaft. A homogenizer assembly is removably coupled to the base, comprising a homogenizing chamber, a rotational support disposed within the homogenizing chamber, and a shredder disposed within the homogenizing chamber and driven by the driving motor for rotational movement within the homogenizing chamber. The shredder is axially supported for rotation within the homogenizing chamber between the drive shaft and the rotational support.

In accordance with another aspect of the present invention, a food homogenizer comprises a base comprising a driving motor with a drive shaft. A homogenizer assembly is removably coupled to the base, comprising a homogenizing chamber and a shredder driven by the drive shaft for rotational movement within the homogenizing chamber. The shredder comprises a socket mechanically coupled to the drive shaft. An end cap is removably coupled to the homogenizing chamber to retain the shredder within the homogenizing chamber. A sealing element is configured to provide a fluid-tight seal between the base and the homogenizer assembly. The sealing element comprises a first sealing flange abutting and circumscribing the socket of the shredder to provide a generally continuous seal between the socket and the homogenizing chamber.

In accordance with another aspect of the present invention, a food homogenizer comprises a base and a homogenizer assembly removably coupled to the base. The homogenizer assembly comprises a homogenizing chamber, an inlet chute in fluid communication with the homogenizing chamber, an exit spout separate from the inlet chute and in fluid communication with the homogenizing chamber, and a twist-lock coupler to removably couple the homogenizer assembly to the base. The homogenizing chamber, inlet chute, exit spout, and twist-lock coupler are formed together as a monolithic structure.

In accordance with another aspect of the present invention, a food homogenizer comprises a base comprising a driving motor, a homogenizing chamber, and a shredder disposed within the homogenizing chamber and driven by the driving motor for rotational movement within the homogenizing chamber. The shredder comprises a conical body extending from a generally cylindrical base towards a vertex and comprises an upper conical surface. The shredder comprises a plurality of blades arranged radially outward from the upper conical surface, wherein each of the plurality of blades is arranged at an angle of approximately 45 degrees relative to the cylindrical base. In one example, the plurality of blades are generally equally spaced about the upper conical surface. In another example, the plurality of blades comprises six blades. In another example, the plurality of blades are removably coupled to the shredder. In another example, the plurality of blades are serrated. In another example, the upper conical surface comprises a depression disposed between an adjacent pair of the plurality of blades. In another example, the depression comprises a generally triangular geometry with gradually sloping sides. In another example, the upper conical surface comprises a plurality of linear slots extending at least partially between the generally cylindrical base and the vertex, and each of the plurality of linear slots being configured to receive one of the plurality of blades. In another example, the shredder further comprises a removable top that defines the vertex of the shredder, and removal of the top from the shredder providing access to an open end of each of the plurality of linear slots. In another example, the plurality of blades are molded into the shredder. In another example, the plurality of blades are formed together with the upper conical surface as a monolithic structure.

In accordance with another aspect of the present invention, a food homogenizer comprises a base and a homogenizer assembly removably coupled to the base. The homogenizer comprises a homogenizing chamber comprising an inner surface, and an exit spout providing fluid communication between the homogenizing chamber and an outside environment. The exit spout comprises a non-symmetrical depression formed with the inner surface extending from a first portion having a generally gradual slope relative to the inner surface of the homogenizing chamber and towards a second portion having a generally abrupt slope defining an end face that is arranged at an angle greater than about 60 degrees relative to the inner surface of the homogenizing chamber. In one example, the end face is arranged generally perpendicular relative to the inner surface of the homogenizing chamber. In another example, the non-symmetrical depression provides an exit aperture with an increasing cross-sectional area having a maximum value adjacent the end face. In another example, the exit spout further comprises a guard extending across at least a portion of the exit aperture.

In accordance with another aspect of the present invention, a food homogenizer comprises a base and a homogenizer assembly removably coupled to the base, comprising a homogenizing chamber and an inlet chute in fluid communication with the homogenizing chamber. A plunger is configured to be received by the inlet chute and has a curved terminal face that cooperates with the homogenizing chamber to provide a generally continuous interior surface for the homogenizing chamber. In one example, the plunger further comprises an enlarged handle distally located from the curved terminal face that acts as a stop configured to limit insertion of the plunger into the inlet chute to an insertion depth where the curved terminal face cooperates with the homogenizing chamber to provide the generally continuous interior surface for the homogenizing chamber. In another example, the inlet chute comprises an open end with a non-symmetrical geometry, and the enlarged handle comprises a non-symmetrical geometry that corresponds with the non-symmetrical geometry of the open end of the inlet chute. In another example, the enlarged handle is configured to mate with the open end of the inlet chute to provide the stop. In another example, the inlet chute defines an inner cross-sectional area, and the plunger comprises an elongate body having a cross-sectional area that substantially extends across the inner cross-sectional area of the inlet chute. In another example, the interior surface of the homogenizer chamber forms a generally conical geometry, and wherein the terminal face comprises a non-symmetrical geometry corresponding with the conical interior surface for the homogenizing chamber.

In accordance with another aspect of the present invention, a food homogenizer comprises a base comprising a driving motor, and a homogenizer assembly removably coupled to the base. The homogenizer assembly comprises a homogenizing chamber comprising an interior surface, and a shredder disposed within the homogenizing chamber and driven by the driving motor for rotational movement within the homogenizing chamber. The shredder comprises a plurality of blades arranged radially outward from an upper surface of the shredder with at least one blade comprising a terminal blade edge. A maximum gap between said terminal blade edge and the interior surface of the homogenizing chamber is about 3 millimeters. In one example, the plurality of blades each comprise a respective terminal blade edge, and wherein a maximum gap between any of said terminal blade edges and the interior surface of the homogenizing chamber is about 3 millimeters. In another example, the homogenizer assembly further comprises an exit spout providing fluid communication between the homogenizing chamber and an outside environment. The exit spout comprises a non-symmetrical depression that cooperates with the inner surface, and a gap between said terminal blade edge and the non-symmetrical depression of the exit spout is greater than 3 millimeters. In another example, the driving motor rotates the shredder at a rotational speed within the range of 300 to 400 revolutions per minute.

It is to be understood that both the foregoing general description and the following detailed description present example and explanatory embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various example embodiments of the invention, and together with the description, serve to explain the principles and operations of the invention.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Figure 1:
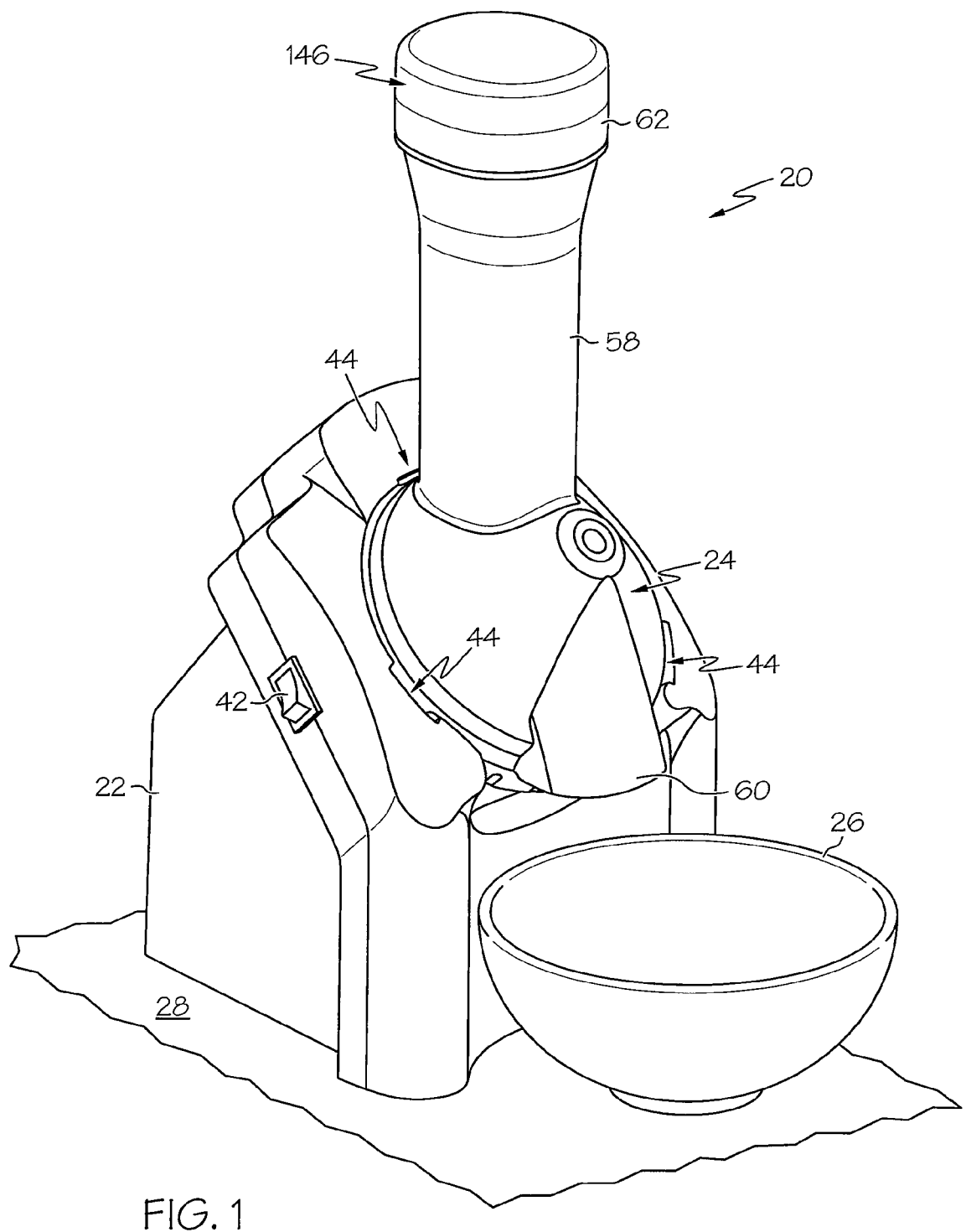
FIG. 1 is a perspective view of an example food homogenizer.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Turning to the shown example of FIG. 1, a food based homogenizer 20 capable of shredding food is shown. The food based homogenizer 20 is capable of blending various types of food products, including frozen fruits, nuts, chocolates, and other ingredients. The blended food product may have a soft puree texture with a similar consistency to ice cream, sherbet, and the like. Though it is understood that the term "homogenize" refers to a uniform mixture of elements, as used herein, the term "homogenize" is intended to generally refer to a somewhat uniform mixture of elements, and may also encompass non-uniform mixture of elements depending upon the particular food products being used and the degree to which they are shredded broken down by the food based homogenizer 20.

The food based homogenizer 20 includes a base 22 and a homogenizer assembly 24. The base 22 and homogenizer assembly 24 are removably attachable and detachable from each other. A receiving vessel, such as a bowl 26, is illustrated positioned to receive the blended food product from the homogenizer assembly 24.

Figure 2:
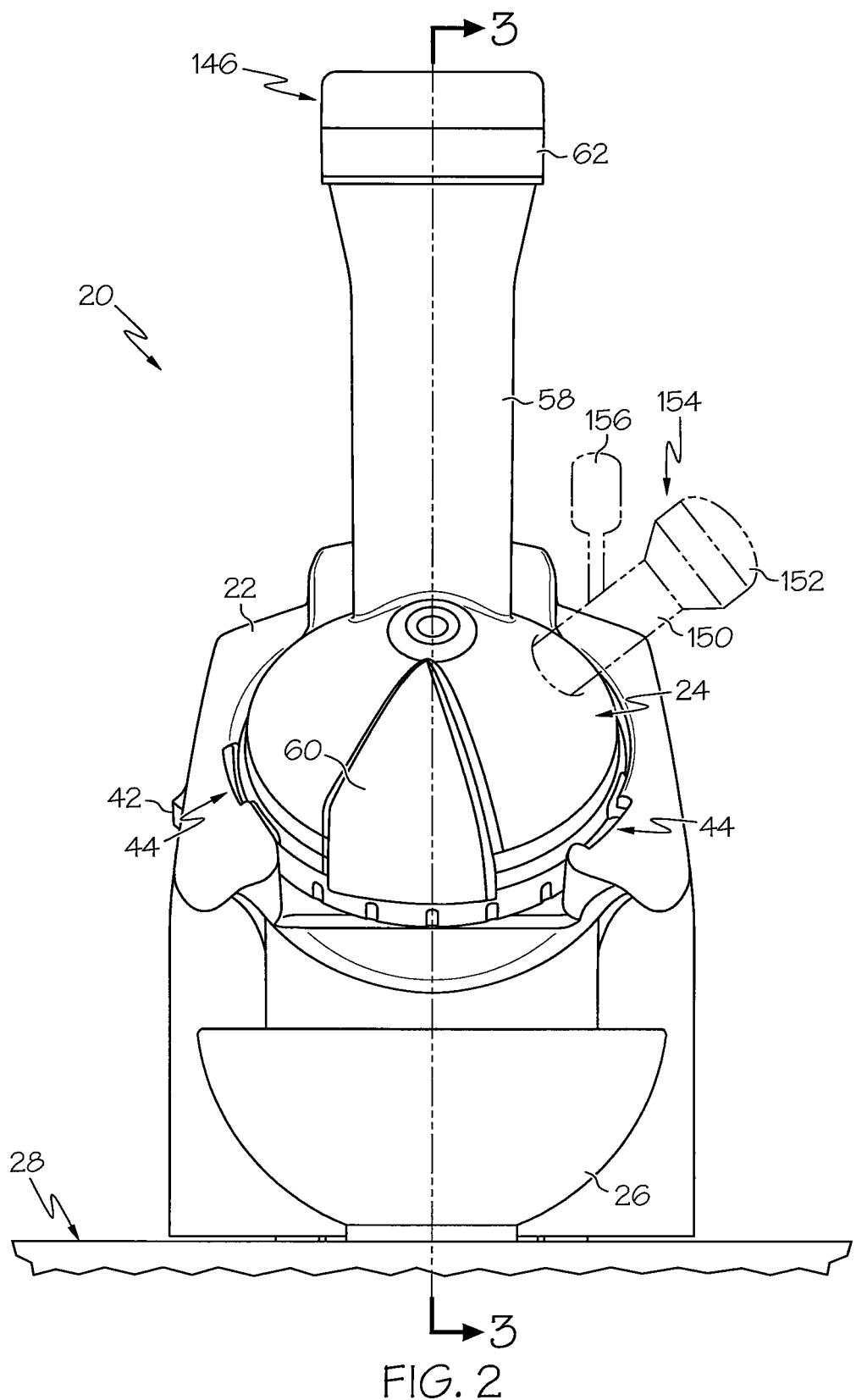
FIG. 2 is a front view of the food homogenizer of FIG. 1.
Figure 3:
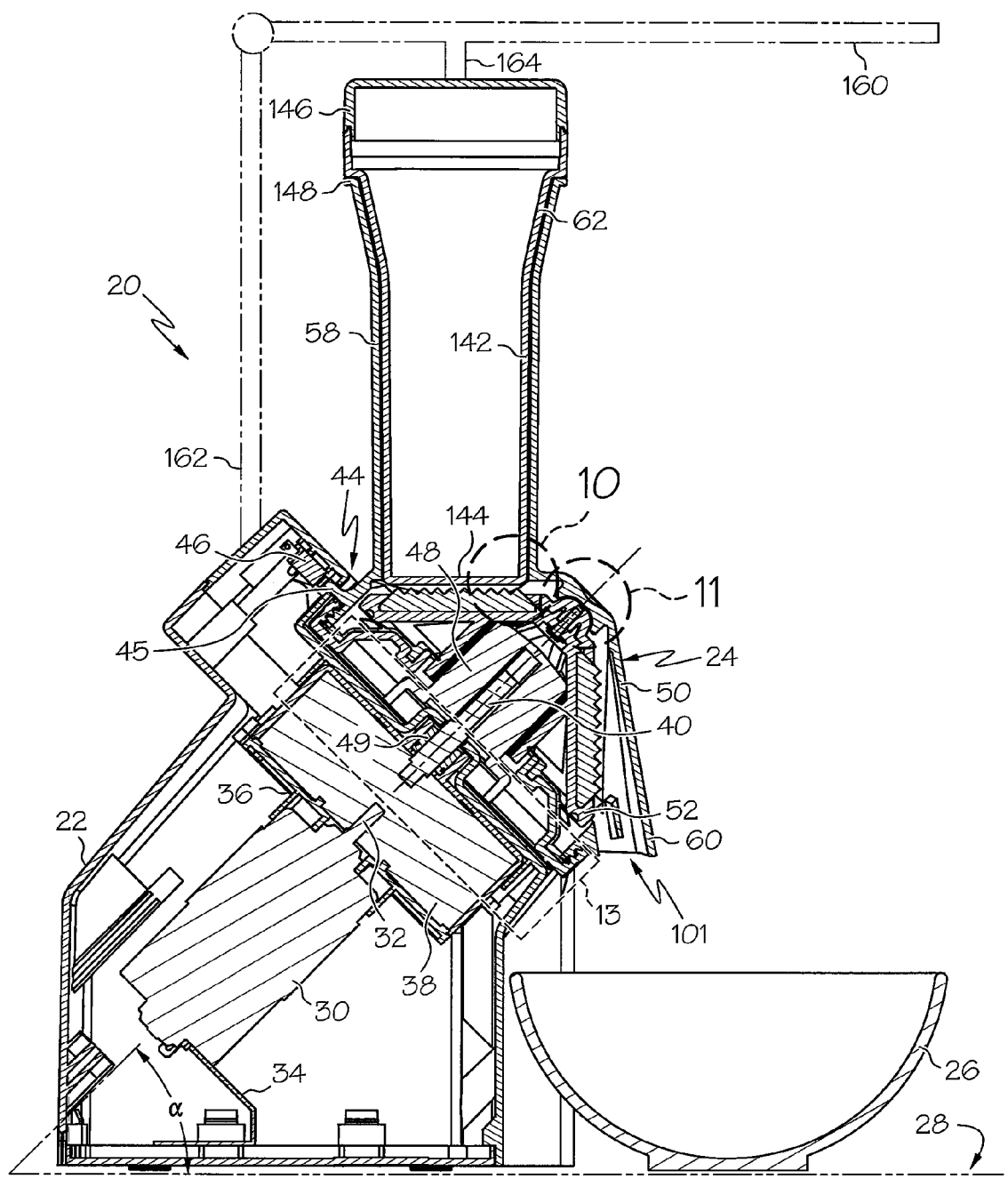
FIG. 3 is a sectional view taken through line 3-3 of FIG. 2.

As shown in FIGS. 1-3, the food based homogenizer 20 includes a base 22 to be supported on a support surface 28, such as a table top, counter, or the like. As shown in FIG. 3, the base 22 includes a driving motor 30 with a drive shaft 32. The driving motor 30 is fixedly supported within the base 22 by one or more motor supports 34, 36. Various types of motor supports 34, 36 can be utilized, such as a motor socket with flanges oriented vertically and perpendicularly to the driving motor 30. The drive shaft 32 can directly or indirectly supply rotational motion to power the operation of the food based homogenizer 20. For example, as shown in FIG. 3, the drive shaft 32 is fed through gearbox 38 that feeds a driven shaft 40. The gearbox 38 can be a step-down gearbox that increases the torque supplied by the driving motor 30 while also reducing the rotational motion speed. In one example, the gearbox 38 can have a step-down ratio in the range of 40-50:1, or even in the range of 45-47:1. For example, the gearbox 38 can be configured to rotate the driven shaft 40 at a rotational speed of about 300-400 revolutions per minute, though other speeds are contemplated. Various types of gearboxes 38 can be utilized comprising various numbers and types of gears, including spur gears, bevel gears, etc. In the shown example, the gearbox 38 is a planetary gear train.

The driving motor 30 can be of generally cylindrical shape can be is provided in the base 22 with the drive shaft 32 being arranged at an angle α relative to the base 22. The angle α can be measured variously, such as relative to the plane of the support surface 28 that the base 22 rest upon. In the shown example, the drive shaft 32 is arranged at a 45° angle relative to the base 22 and plane of the support surface 28. As shown, the driven shaft 40 can be generally parallel to the drive shaft 32 such that both are similarly arranged at a 45° angle relative to the base 22. Still, it is contemplated that, due to the gearbox 38, the drive shaft 32 of the driving motor 30 may be arranged at some other angle, while the driven shaft 40 is arranged at a 45° angle relative to the base 22.

The drive shaft 32 and/or driven shaft 40 are described above as extending at a 45° angle from the center of the motor. It is to be understood, that the motor and drive shaft may be oriented at varying angles with respect to each other and to the base 22. For instance, the motor may be oriented horizontally, vertically, or at a varying angle in between with the drive shaft 32 and/or driven shaft 40 extending from the top of the motor 30 at a 45° angle through a hole centered in the bottom of the lower portion of the base 22. Alternatively, the motor 30 may be oriented at a 45° angle with the drive shaft 32 extending through the centerline of the motor 30 and, thus, the drive shaft extends at a 45° angle. The gearbox 38 and driven shaft 40 can be correspondingly arranged.

As shown in FIG. 3, the driven shaft 40 is attached to a drive coupler 48 that is similarly oriented at a 45° angle relative to the base 22. The drive coupler 48 can be a stub shaft or the like that is fixedly secured to the driven shaft 40 so as to rotate therewith. As shown, the drive coupler 48 extends through a hole in the base 22 and is the only portion of the motor structure that is visible from outside of the base 22 (see FIG. 4). The drive coupler 48 is configured to easily interface with the homogenizer assembly 24 to provide rotational operation. The drive coupler 48 can have a keyed geometry, such as a hexagonal geometry that provides six drive surfaces, for a simplified interface with the homogenizer assembly 24. Other geometries are contemplated, such as square, rectangle, triangular, polygonal, random, notched, or otherwise keyed, spline, etc. The geometry of the drive coupler 48 is configured to have sufficient strength to transmit the desired torque from the driving motor 30 at the desired rotational speed.

The base 22 can further provide various other features. For example, the base 22 can provide operator controls, such as an on-off switch 42 (FIG. 1) to selectively provide power to the driving motor 30. It is contemplated that a speed selector or even pulse operation controls could be provided. The base 22 can also provide a coupling arrangement for removably receiving the homogenizer assembly 24. In the shown example, the base 22 provides a twist-lock arrangement 44 for securely receiving the homogenizer assembly 24. The homogenizer assembly 24 includes one or more twist-lock coupler(s) 45 (see FIGS. 6-7) to be received by and interface with the twist-lock arrangement 44 of the base 22. In one example, the twist-lock arrangement 44 can provide a plurality of mounting apertures adapted to receive and engage the twist-lock couplers 45 to couple the homogenizer assembly 24 to the base 22. As shown, three twist-lock couplers 45 are aligned with the mounting apertures of the twist-lock arrangement 44 to be inserted therein. Additionally, the direction of twist for securing the homogenizer assembly 24 into the twist-lock arrangement 44 of the base 22 can be the same direction of rotation as the driven shaft 40 so as to reduce loosening the homogenizer assembly 24 during operation of the food based homogenizer 20. One or more of the twist-lock coupler(s) 45 can include a positive retention structure, such as a raised bump or the like that can interface with a corresponding recess within the mounting apertures of the twist-lock arrangement 44. Engagement of the bump with the corresponding recess can provide a positive attachment that resists disengagement, and/or provides a tactile feedback of a positive connection.

Additionally, the base 22 can include a safety switch 46 that will interrupt operation of the driving motor 30 unless the homogenizer assembly 24 is secured to the base 22. The safety switch 46 can cut power to the driving motor 30, or otherwise stop operation of the food based homogenizer 20. In one example, the safety switch 46 (which may or may not provide a visual indicator) can be disposed within or adjacent to the mounting apertures of the twist-lock arrangement 44. Thus, the safety switch 46 can be actuated (physically, optically, etc.) by the twist-lock coupler 45 to thereby permit operation of the driving motor 30 when a twist-lock coupler 45 is received by the twist-lock arrangement 44. Conversely, operation of the driving motor 30 is not permitted unless the twist-lock coupler 45 is engaged with the mounting aperture of the twist-lock arrangement 44. Additionally, the base 22 and/or driving motor 30 can include fuses to prevent thermal or electrical overload conditions.

Figure 4:
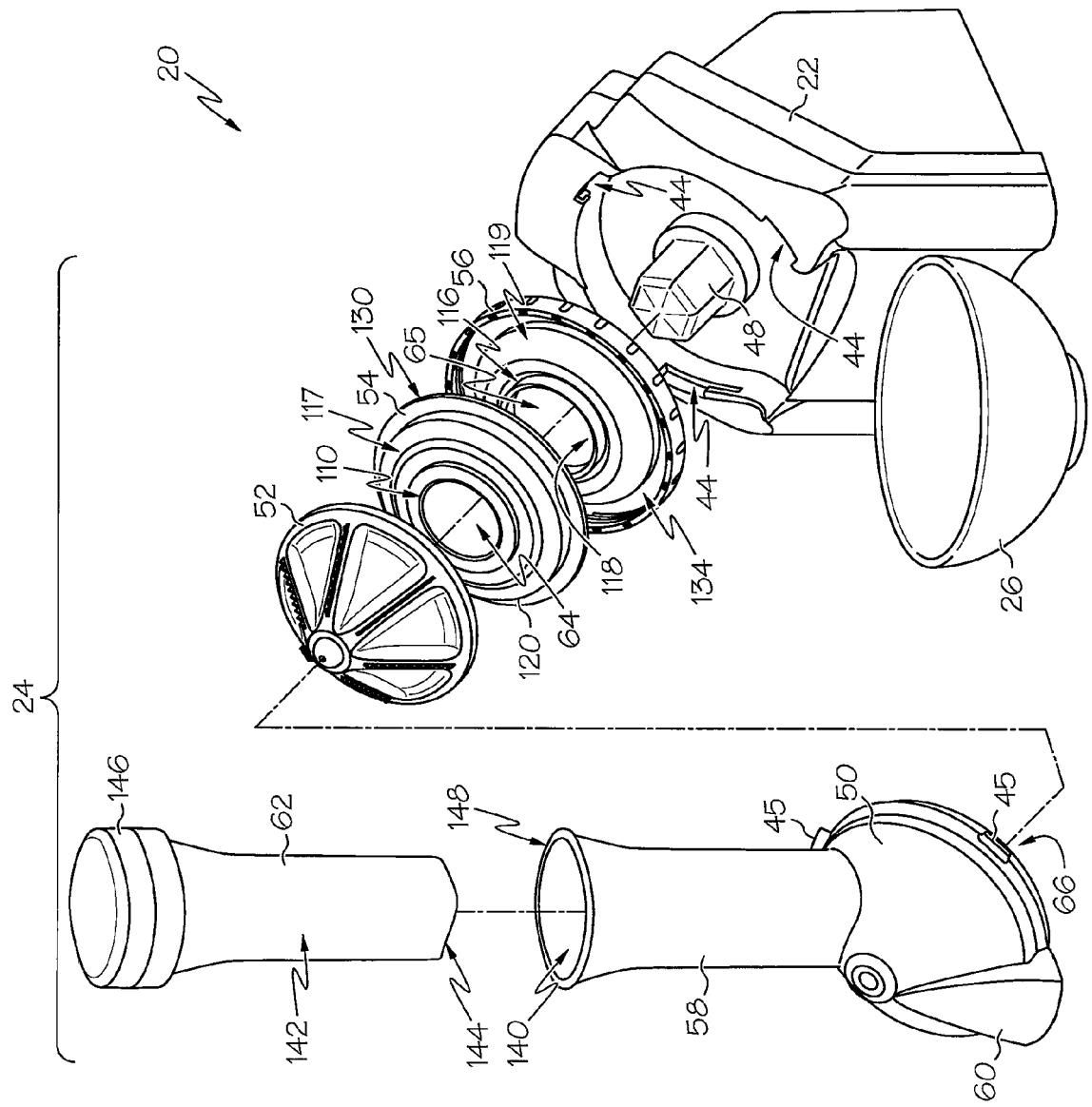
FIG. 4 is an exploded view of the food homogenizer of FIG. 1.

Turning now to FIGS. 4-7, the food based homogenizer 20 includes a homogenizer assembly 24 where the shredding and blending of various types of food products is performed. The homogenizer assembly 24 includes a homogenizing chamber 50, a shredder 52, a sealing element 54, and an end cap 56. An inlet chute 58 is arranged in fluid communication with the homogenizing chamber 50, and an exit spout 60, separate from the inlet chute 58, is also in fluid communication with the homogenizing chamber 50. A plunger 62 is configured to be at least partially received by the inlet chute 58. As shown in FIG. 4, the homogenizer assembly 24 is configured to be disassembled to permit easy cleaning and maintenance.

The end cap 56 is removably coupled to the homogenizing chamber 50 to retain the shredder 52 and sealing element 54 within the homogenizing chamber 50. In one example, the end cap 56 is removably coupled to the homogenizing chamber 50 by a threaded coupling (either can have male/female threads). As shown, the homogenizing chamber 50 may be removably attached to the end cap 56 by inserting the bottom edge of the homogenizing chamber 50 into a top opening of the end cap 56. Therefore, the screw threads may be aligned and the end cap 56 rotated until rotation guided by the screw threads is complete. Alternative or additional securing means may be provided to secure the homogenizing chamber 50 to the end cap 56. For instance, latches, twist-locks, hooks, apertures, mechanical fasteners, or the like may be provided on either or both to allowing for attachment therebetween.

Conversely, once the end cap 56 has been removed from the homogenizing chamber 50, the shredder 52 and sealing element 54 can be removed.

Figure 7:
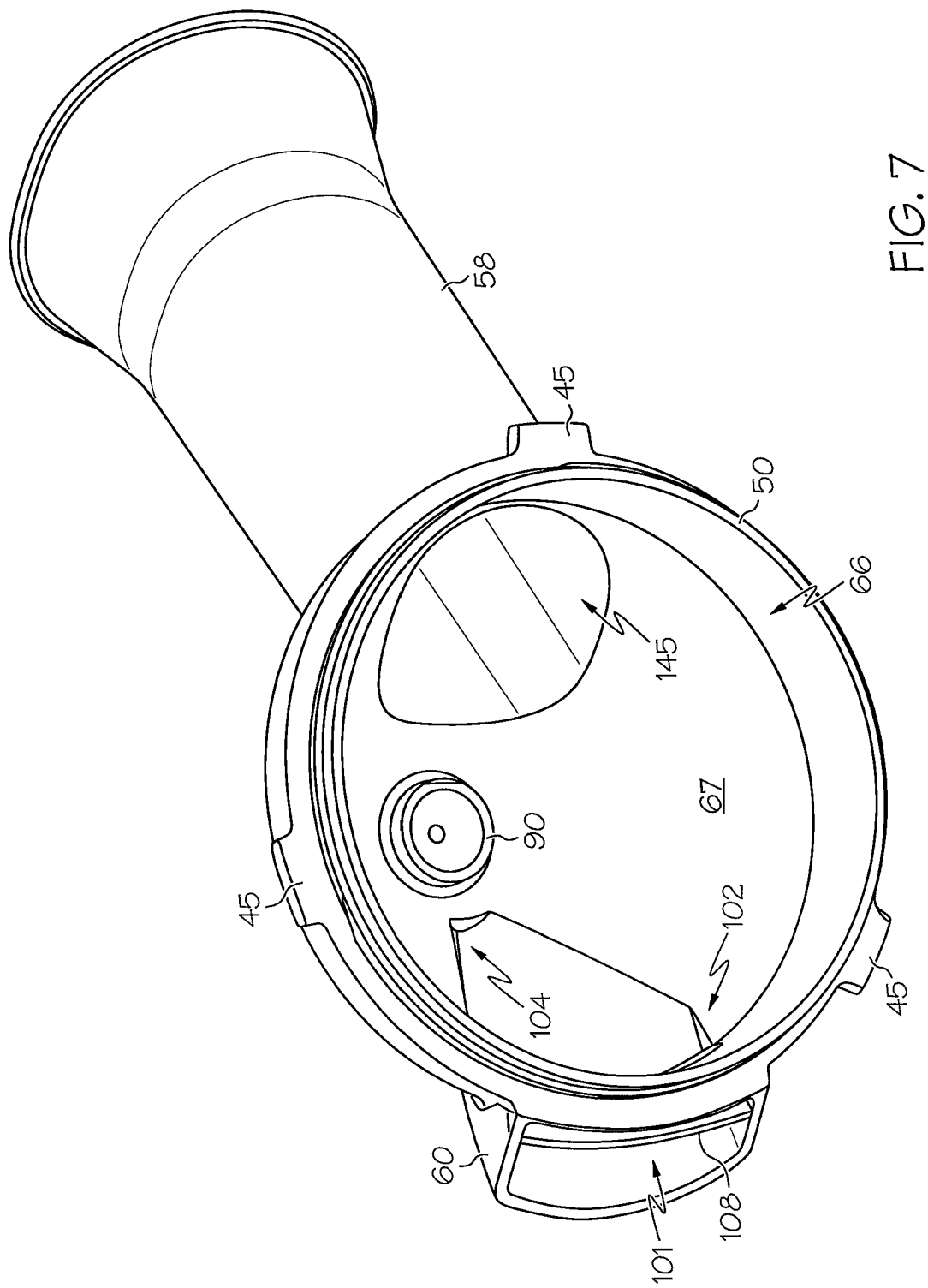
FIG. 7 is a bottom, perspective view of the homogenizing chamber of FIG. 6.

Attachment of the end cap 56 to the homogenizing chamber 50 defines a hollow interior 66 of the homogenizing chamber 50 (see FIG. 7). The hollow interior 66 is at least partially bounded by an inner surface 67. The shredder 52 is disposed within the hollow interior 66 of the homogenizing chamber 50 for rotation therein and adjacent to the inner surface 67. The shredder 52 is driven for rotational movement within the hollow interior 66 of the homogenizing chamber 50 by the driving motor 30 via engagement with the drive coupler 48. Accordingly, the sealing element 54 and the end cap 56 each include a circular hole 64, 65 at their respective centers through which the drive coupler 48 penetrates. Similarly, the shredder 52 includes a socket 71 (see FIG. 9) that is mechanically coupled to the drive shaft 32 of the driving motor 30, such as via the driven shaft 40 and drive coupler 48. The holes 64, 65 and socket 71 are arranged coaxially with the drive coupler 48.

The homogenizer assembly 24 can include various features. In one example, the homogenizing chamber 50, inlet chute 58, exit spout 60, and twist-lock coupler 45 can all be formed together as a monolithic structure. For example, the homogenizing chamber 50, inlet chute 58, exit spout 60, and twist-lock coupler 45 can all be molded together as a single part. Forming these parts together as a single unit can be beneficial to reduce manufacturing costs, as well as simplifying operation. Still, any or all of these parts can be provided separately and coupled together to form a monolithic structure.

Figure 6:
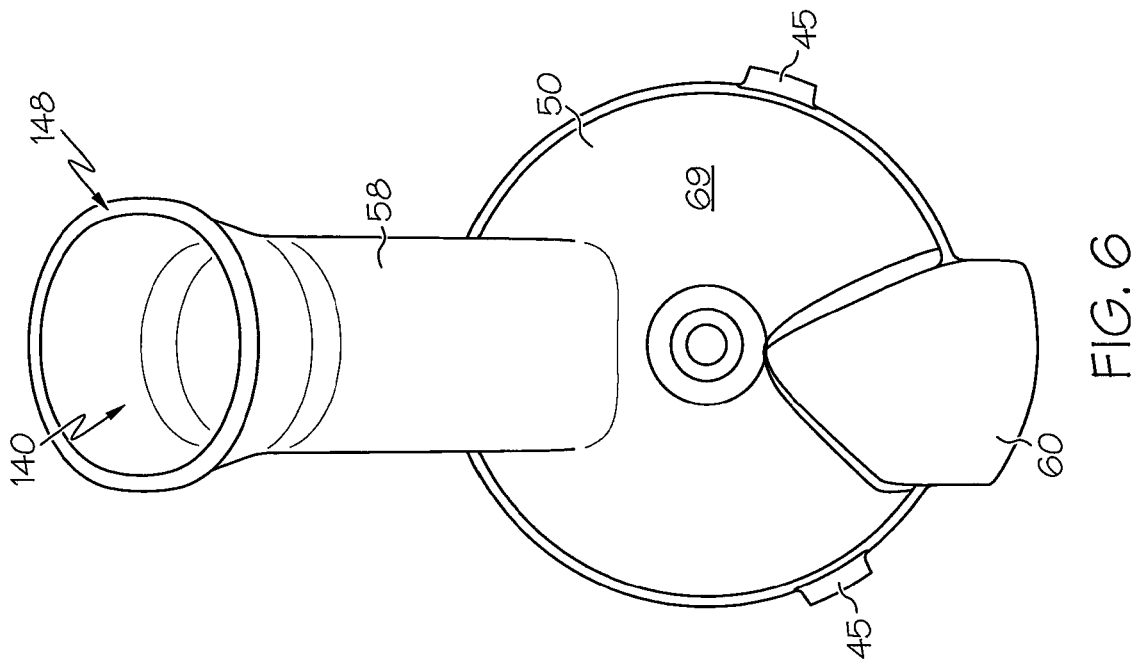
FIG. 6 is a top view of an example homogenizing chamber.
Figure 5:
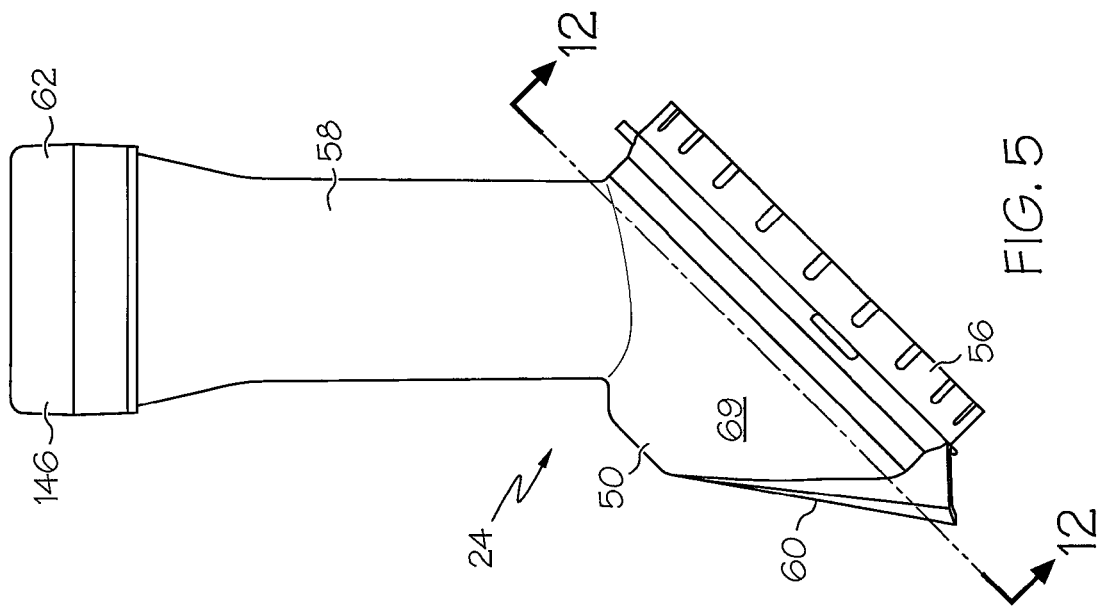
FIG. 5 is a side view of an example homogenizer assembly.

As shown in FIGS. 5-6, the portions of the homogenizer assembly 24 can be arranged variously. In one example, the homogenizing chamber 50 can comprise an exterior surface 69, and the inlet chute 58 can be arranged generally perpendicular relative to the exterior surface 69. Such an arrangement can permit the inlet chute 58 to extend generally straight and vertically upwards from the base 22 (e.g., see FIG. 3), and/or can also arrange the inlet chute 58 to be generally perpendicular to the shredder 52. In another example, the inlet chute 58 and exit spout 60 can be arranged generally 180 degrees apart, though other angular arrangements are contemplated.

Figure 8:
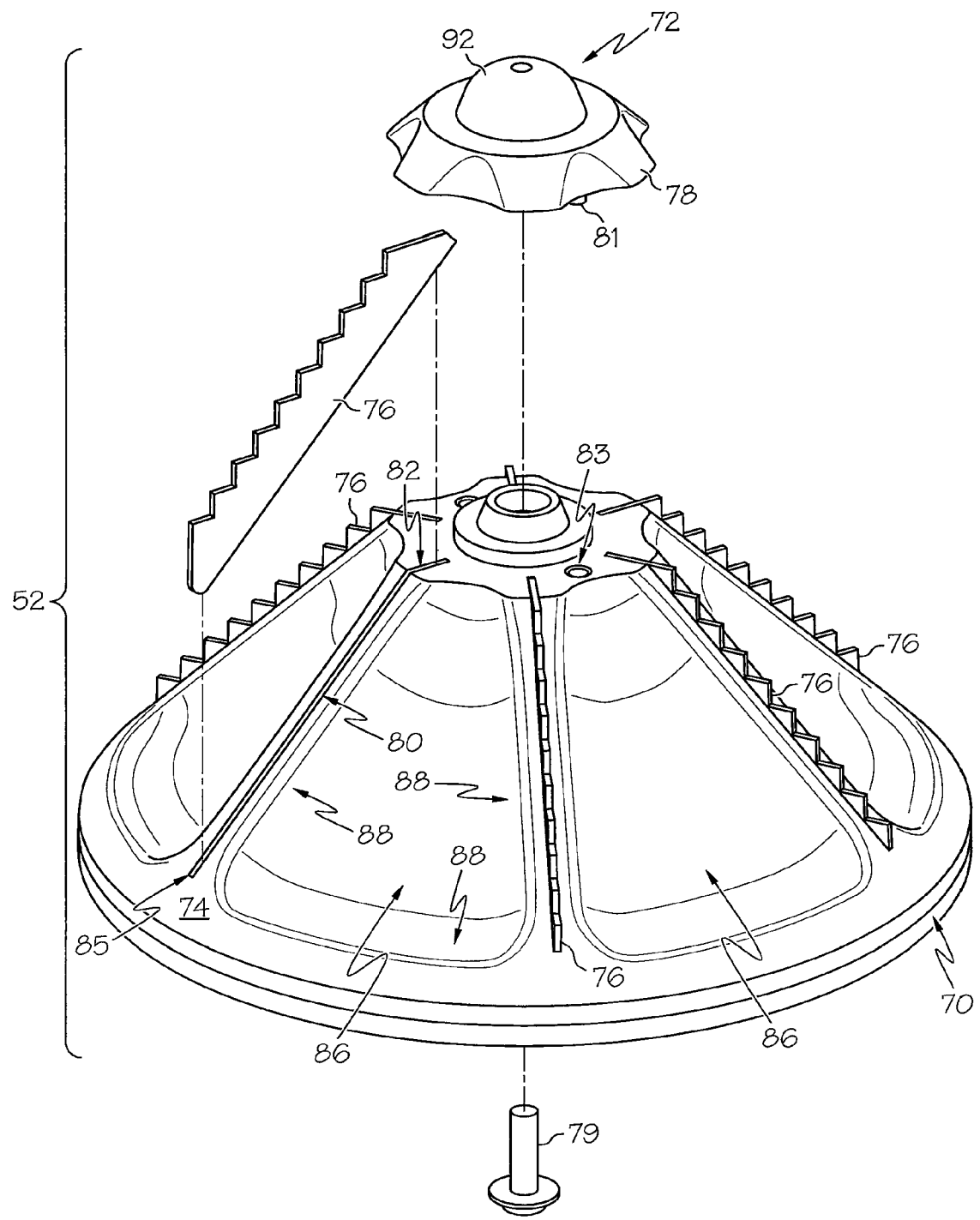
FIG. 8 is a partial, exploded view of an example shredder.
Figure 9:
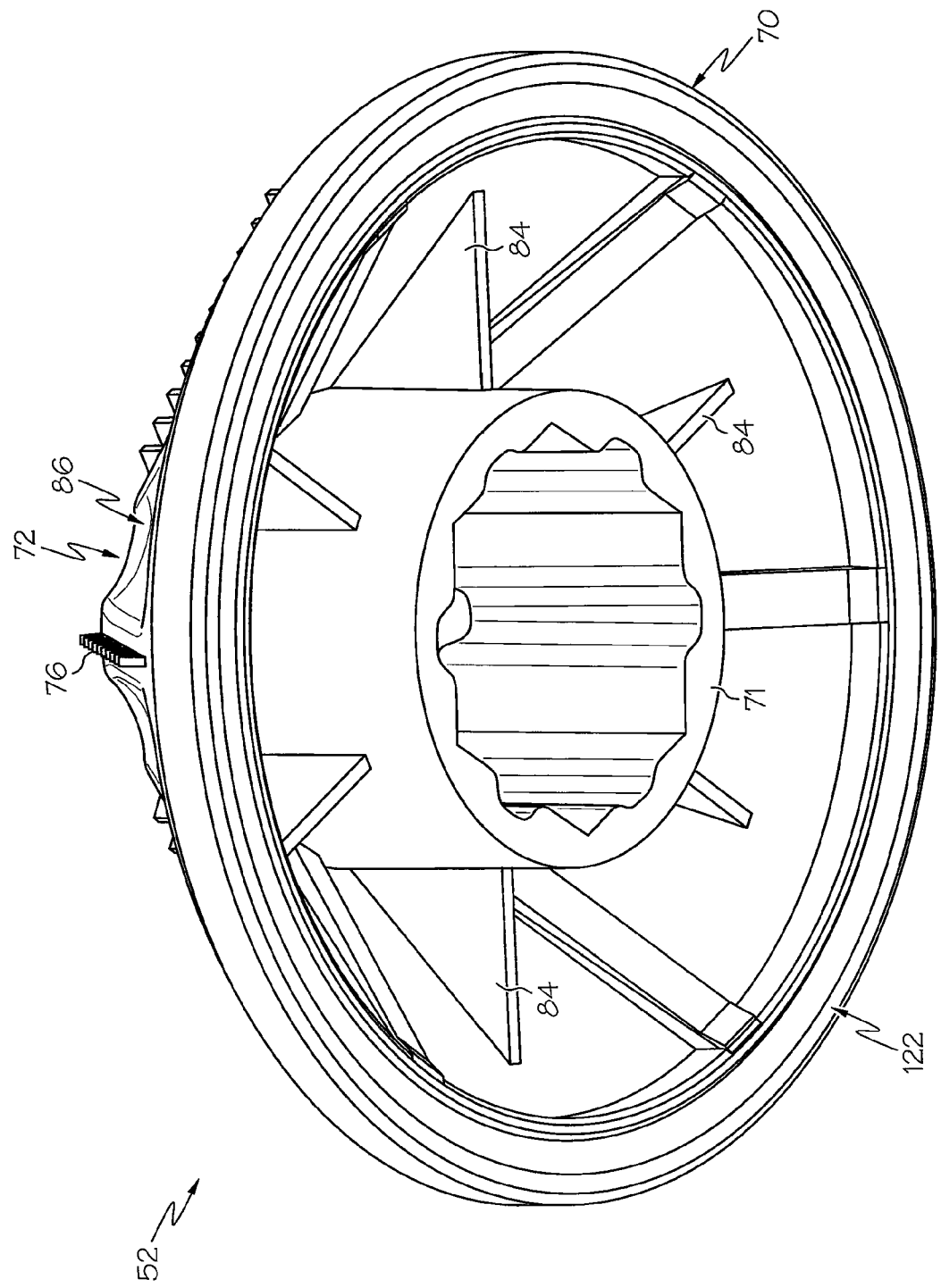
FIG. 9 is a bottom, perspective view of the shredder of FIG. 8.

Turning now to FIGS. 8-9, the shredder 52 includes a generally conical body extending from a generally cylindrical base 70 towards a vertex 72 and defines an upper conical surface 74. Though it is understood that the term "vertex" refers to the point farthest from the base, as used herein, the term "vertex" is intended to generally refer to the end region of the conical geometry of the shredder 52. Thus, while the vertex 72 of the shredder 52, as shown, does include the point furthest from the cylindrical base 70, it is also intended to include the overall region located about said furthest point. The shredder 52 may have a cross section having a larger diameter about the cylindrical base 70 that tapers to a smaller diameter about the vertex 72. The upper conical surface 74 is arranged at an angle relative to the generally cylindrical base 70, such as at an approximately 45° angle. The shredder 52 may be formed of a number of food-safe materials, such as thermoplastic, aluminum or stainless steel.

The shredder 52 includes the socket 71 described above for receiving the drive coupler 48. The internal geometry of the socket 71 corresponds to that of the keyed geometry of the drive coupler 48. For example, as illustrated, where the drive coupler 48 has a male hexagonal geometry, the socket 71 has a corresponding female hexagonal geometry. In additionally or alternatively, the socket 71 can also include other geometry, such as rounded indents in some or all of the walls of the hexagonal geometry, etc. The socket 71 can be supported within the underside of the shredder 52 by a plurality of flanges 84 oriented perpendicularly to the socket 71. In the shown example, there are six flanges 84 having a generally equal space therebetween. It is to be understood that the flanges 84 may take any shape, such as flat, square, or may comprise one or more protrusions, etc. The flanges 84 may also provide structural support for the remainder of the shredder 52.

The shredder 52 further includes a plurality of blades 76 arranged radially outward from the upper conical surface 74 and extending from an upper portion towards a lower portion of the shredder 52. Though illustrated as only extending along a portion of the shredder 52, it is to be understood that the blades may extend completely from about the vertex 72 to the generally cylindrical base 70. In one example, the plurality of blades 76 are arranged generally parallel with the upper conical surface 74, and as such are arranged at a similar 45° angle relative to the cylindrical base 70. The blades 76 may be oriented perpendicularly to the upper conical surface 74 of the shredder 52.

The plurality of blades 76 can be arranged variously about the shredder 52. For example, the plurality of blades 76 can be generally equally spaced about the upper conical surface 74. It is also contemplated that the plurality of blades 76 can be arranged in various groupings, patterns, randomly, etc. Moreover, various numbers of blades 76 can be utilized. In the shown example, the plurality of blades 76 can include six blades. All of the blades can be identical, though any could also be different.

The blades 76 can also have different geometries and/or cutting features. In the shown example, the plurality of blades 76 can be serrated to provide a greater cutting or shredding action. For example, each of the plurality of blades 76 can have a plurality of teeth that form a repeating, triangular peak-and-valley serration, though other serration patterns are contemplated. In one example, the serration pattern can be formed by casting or stamping the desired blade pattern out of a solid piece of metal or other rigid material. In addition or alternatively, the edges of the desired serration pattern described above can even be further serrated. For example, some or all of the numerous edges of the teeth that form the shown triangular peak-and-valley serration can themselves be further serrated to provide an even greater cutting or shredding action. In addition or alternatively, the teeth of the plurality of blades 76 can have various tooth configurations, such as straight tooth, beveled tooth, alternating beveled tooth, etc. In addition or alternatively, different parts of the blades 76 can have different features, geometries, etc. to perform different actions.

The plurality of blades 76 can be manufactured in various manners. In one example, the shredder 52 can be formed from a thermoplastic material. Some or all of the plurality of blades 76 can be molded together with the shredder 52. For example, the plurality of blades can be formed together with the upper conical surface 74 as a monolithic structure. Serrations or other design features can similarly be molded.

Alternatively, as shown, the shredder 52 can be formed from a thermoplastic material but the plurality of blades 76 can be formed of metal or other rigid material. Each of the plurality of blades 76 can be individually manufactured (i.e., stamped, cast, etc.) and assembled together with the thermoplastic shredder 52. As can be appreciated, the plurality of blades 76 can be removably or non-removably coupled to the shredder 52.

For example, as shown in FIG. 8, the upper conical surface 74 of the shredder 52 can include a plurality of linear slots 80 extending at least partially between the generally cylindrical base 70 and the vertex 72. Each of the linear slots 80 is configured to receive one of the plurality of blades 76. Additionally, the shredder 52 can include a removable top 78 that defines the vertex 72. The removable top 78 can be held on by various mechanical fasteners 79, such as screws, clips, threads, etc. The removable top 78 may also include anti-spinning pins 81 or the like that are retained by corresponding holes 83 or the like in the top of the shredder 52 to inhibit the removable top 78 from spinning or moving relative to the rest of the shredder 52. Removal of the top 78 from the shredder 52 provides access to an open end 82 of each of the plurality of linear slots 80. Thus, each of the blades 76 can be slidingly received by one of the linear slots 80 via its respective open end 82 and towards a closed end 85. The blades 76 may be removably or non-removably received by the linear slots 80. For example, the blades 76 can be removably received in the linear slots 80 to be removed at a later time for repair or replacement. Alternatively, the blades 76 can be non-removably received in the linear slots 80 by mechanical fasteners, adhesives, welding, etc. Once all of the blades are inserted into the linear slots 80, the removable top 78 can be secured to the shredder 52 to inhibit removal of the blades 76. It is further contemplated that some of the blades can be molded together with the shredder 52, while other blades can be later attached to the shredder 52.

The shredder 52 can include various other features. For example, the shredder 52 can be provided with structure to facilitate the shredding and homogenizing action performed on the food ingredients to form the soft texture with a similar consistency as ice cream or sherbet. In one example, the upper conical surface 74 of the shredder 52 can include structure to facilitate the flow of the shredded/homogenized food around and across the plurality of blades 76. As shown in FIG. 8, the upper conical surface 74 can include at least one depression 86 disposed between an adjacent pair of the plurality of blades 76. Various numbers of depressions 86 can be provided. As shown, a total of six depressions 86 can be provided between adjacent pairs of the six blades 76. The depressions 86 can each have identical, similar, or different geometries. In one example, each depression 86 can include a generally triangular geometry that follows the generally conical geometry of the shredder 52. Additionally, the depressions 86 can have gradually sloping sides 88 to facilitate the flow of shredded/homogenized food into and out of the depressions 86 and across an adjacent blade 76. The interaction of the depressions 86 and the inner surface 67 of the homogenizing chamber 50 can even create a pumping-type action to facilitate movement and/or homogenizing of the food. Still, the sides of the depressions 86 can have various geometries, such as sharp abrupt walls or heavily ramped slopes. Further, as shown in FIG. 8, at least a portion of the depressions 86 can be formed by the removable top 78.

Figure 10:
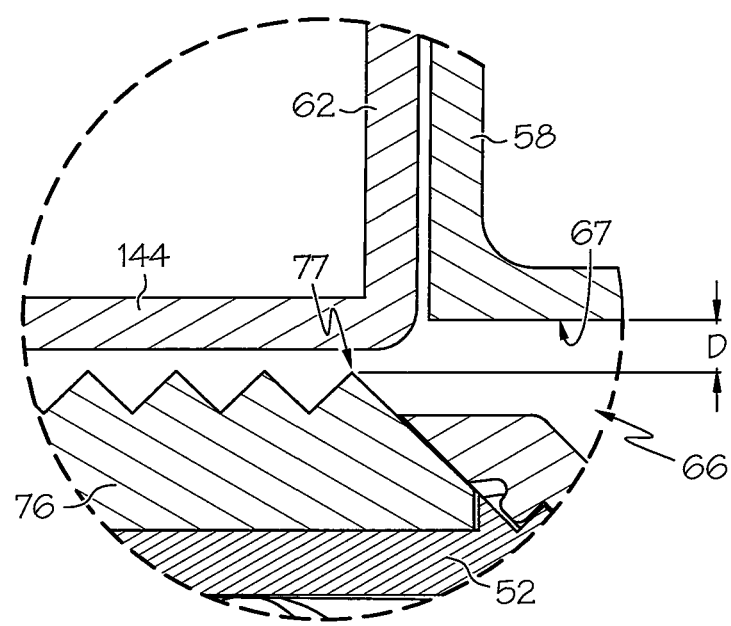
FIG. 10 shows detail view 10 of FIG. 1.

The interface between the homogenizing chamber 50 and the shredder 52 is controlled in order for the food ingredients to be shredded/homogenized to the desired soft texture with a similar consistency as ice cream or sherbet. As described above, the hollow interior 66 of the homogenizing chamber 50 is at least partially bounded by the inner surface 67, and the shredder 52 is driven by the driving motor 30 to rotate within the hollow interior 66 and adjacent the inner surface 67 (see FIG. 3). Turning now to FIG. 10, which shows detail view 10 of FIG. 3, a gap distance D between the plurality of blades 76 of the shredder 52 and the inner surface 67 of the homogenizing chamber 50 is controlled. In one example, at least one blade 76 includes a terminal blade edge 77. For example, the terminal blade edge 77 can be the most outwardly extending portion of each blade 76. Here, the distance D is measured as between the terminal blade edge 77 and the inner surface 67 of the homogenizing chamber 50. In one example, a maximum gap D between the terminal blade edge 77 and the inner surface 67 of the homogenizing chamber 50 is in the range of about 2 millimeters to about 4 millimeters. In other examples, the maximum gap D is about 3 mm, 2.5 mm, or even 2 mm, though other lesser or greater distances are contemplated. Additionally, each of the plurality of blades 76 can include a respective terminal blade edge 77, each of which will define a respective gap with the inner surface 67. In one example, a maximum gap D between any of said terminal blade edges 77 and the interior surface of the homogenizing chamber 50 is about 3 millimeters.

Figure 11:
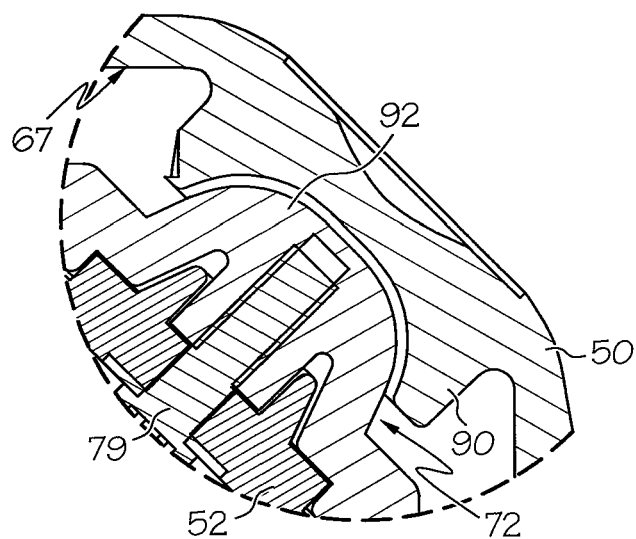
FIG. 11 shows detail view 11 of FIG. 1.

In addition or alternatively, rotation of the shredder 52 within the homogenizing chamber 50 is controlled such that the shredder 52 is rotationally supported. For example, rotational support of the shredder 52 during rotation thereof can facilitate maintaining the maximum gap D described above, and/or prevent unwanted vibration, binding, wear, etc. Turning to FIG. 11, which shows detail view 11 of FIG. 3, a rotational support 90 is disposed within the homogenizing chamber 50 such that the shredder 52 is axially supported for rotation within the homogenizing chamber 50 between the drive shaft 32 and the rotational support 90. Thus, at one end, the shredder 52 can be rotationally supported via the interface between the socket 71 and the drive coupler 48. The drive coupler 48 can be axially supported by a bearing 49 or the like of the driven shaft 40. At the other end, the vertex 72 of the shredder 52 is rotationally supported by the rotational support 90.

Various types of rotational supports 90 can be provided. In one example, the rotational support 90 can include a concave socket and the shredder 52 can include convex structure configured to be rotationally supported by the socket (or vice-versa). As shown in FIGS. 8 and 11, the vertex 72 of the shredder 52 can include a convex, ball-shaped support 92 configured to interface with the concave, rotational support 90. Thus, the ball-shaped support 92 can rotate within the concave rotational support 90 during rotation of the shredder 52. It is understood that the illustration of FIG. 11 is drawn for clarity, and that the interface of rotational support 90 and ball-shaped support 92 is intended to provide a good fit. It is contemplated that the concave socket of the rotational support 90 can receive a substantial portion of the ball-shaped support 92 such that the vertex 72 of the shredder 52 is inhibited, such as prevented, from tilting or substantially changing angle to thereby maintain the vertex 72 in axial alignment with the drive coupler 48 during rotation of the shredder 52.

The rotational support 90 can be provided variously within the homogenizing chamber 50. In one example, the rotational support 90 is formed together with the inner surface 67 of the homogenizing chamber 50. For example, as shown in FIGS. 7 and 11, the rotational support 90 can be molded together with the inner surface 67. In other examples, the rotational support 90 can be provided separate from and be coupled to the inner surface 67, such as by mechanical fasteners, adhesives, welding, etc. In still yet other examples, the rotational support 90 can include at least one of a bushing and a bearing. For example, the bushing or bearing could be coupled to the inner surface 67, and the vertex 72 of the shredder 52 could removably interface with and be rotationally supported by the bushing or bearing.

As described herein, the driven shaft 40 and drive coupler 48 are arranged at a 45° angle relative to the base 22, and the socket 71 of the shredder 52 is retained on the drive coupler 48. Similarly, the upper conical surface 74 of the shredder 52 is arranged at an approximately 45° angle relative to the generally cylindrical base 70. Thus, as shown in FIGS. 3 and 10, the combined angles of the drive coupler 48 and the upper conical surface 74 can orient the plurality of blades 76 to pass generally parallel to the inner surface 67 of the homogenizing chamber 50 when the shredder 52 rotates. Moreover, because of the orientation of the inlet chute 58 as generally perpendicular relative to the inner and/or exterior surfaces 67, 69 relative to the shredder 52, the food travelling along the inlet chute 58 and into the homogenizing chamber 50 will engage the plurality of blades 76 of the shredder at a generally 90° or perpendicular orientation. The food will then continue to be shredded/homogenized within the homogenizing chamber 50 by the plurality of blades 76 as the shredder 52 rotates, until finally discharged via the exit spout 60. It is to be understood, however, that the shredder 52 axis may be oriented at various angles, depending on the embodiment. For instance, the shredder 52 axis may be oriented at greater than or less than a 45° angle, and the food may contact the blades 76 at other angles.

After the food is sufficiently shredded and/or homogenized, it is discharged from the homogenizing chamber 50 via the exit spout 60 and into an awaiting bowl 26 cup, jar, etc. Thus, the exit spout 60 provides fluid communication between hollow interior 66 of the homogenizing chamber 50 and an outside environment. The exit spout 60 is substantially vertically oriented and located above the bowl 26 to allow the effects of centrifugal force and gravity to help discharge the food into the bowl 26.

Figure 12:
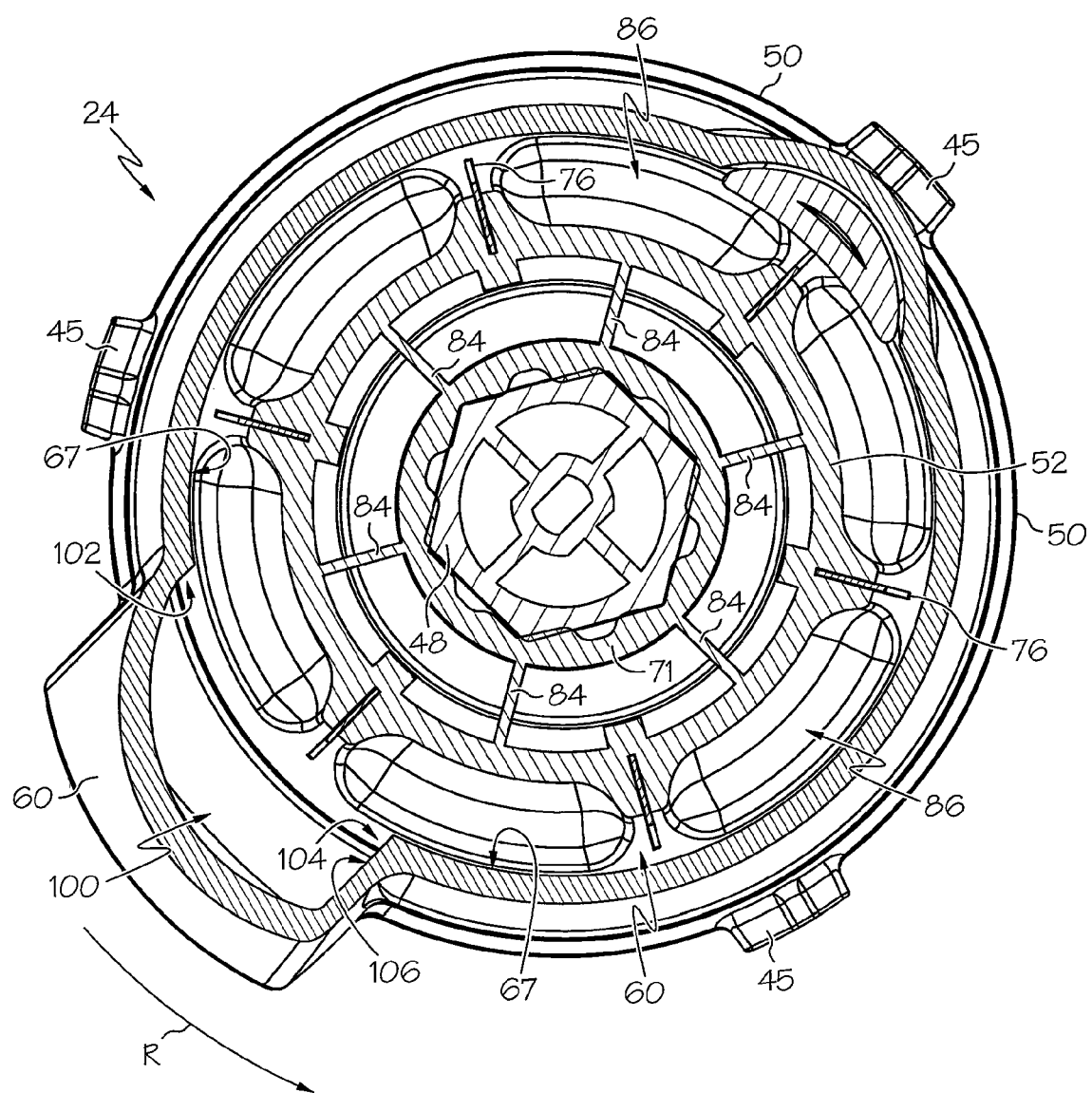
FIG. 12 is a sectional view taken through line 12-12 of FIG. 5.

Turning now to FIG. 12, which is a sectional view taken along line 12-12 of FIG. 5, the exit spout 60 includes various features to facilitate discharging the food therefrom. For example, the exit spout 60 includes a non-symmetrical depression 100 formed with the inner surface 67 of the homogenizing chamber 50 that provides an exit aperture 101 (see FIGS. 3 and 7). The depression extends from a first portion having a generally gradual slope 102 relative to the inner surface 67 of the homogenizing chamber 50, and towards a second portion having a generally abrupt slope 104 defining an end face 106 that is arranged at an angle greater than about 60° relative to the inner surface 67 of the homogenizing chamber 50. In one example, the end face 106 is arranged generally perpendicular (i.e., 90°) relative to the inner surface 67 of the homogenizing chamber 50, though various angles are contemplated.

As shown in FIG. 12, it is appreciated that the shredder 52 rotates in the direction shown by arrow R (i.e., counter-clockwise, as shown). Thus, as the shredder 52 rotates within the homogenizing chamber 50 to shred/homogenize the food, the homogenized food product contained within the homogenizing chamber 50 correspondingly moves through along the direction or arrow R. As the food product approaches the exit spout 60, it will gradually enter the region of the exit spout 60 along the generally gradual slope 102 of the first portion. As additional food product enters and continues to fill the depression 100 of the exit spout 60, some of the food product will next encounter the generally abrupt slope 104 and strike the end face 106. Due to the generally abrupt slope 104 of the second portion, as well as the relatively small distance D between the blades 76 and inner surface 67, relatively little of the food product will re-enter the homogenizing chamber 50. Instead, the food will impinge upon the end face 106, forcing the food to be discharged via the exit aperture 101.

To further facilitate discharge of the blended/homogenized food product, the non-symmetrical depression provides the exit aperture 101 with an increasing cross-sectional area having a maximum value adjacent the end face 106. For example, as shown in FIGS. 7 and 12, the cross-sectional area of the exit aperture 101 increases gradually from the first portion about the gradual slope 102 towards the second portion about the abrupt slope 104 to permit an increasing amount of blended/homogenized food product to accumulate against the end face 106.

Additionally, because the non-symmetrical depression can be adjacent to and/or formed together with the inner surface 67, it is to be appreciated that the distance ID measured as between the terminal blade edge 77 and depression may be greater than the aforedescribed 3 millimeters. Finally, the exit spout can further include a guard 108 extending across at least a portion of the exit aperture 101. As shown in FIG. 7, the guard 108 can be a thin barrier wall that extends across the length of the exit aperture 101, and possibly a distance up into the exit spout 60, though various geometries are contemplated. The guard 108 is configured to inhibit, such as prevent, foreign objects from entering the homogenizing chamber 50.

Figure 13:
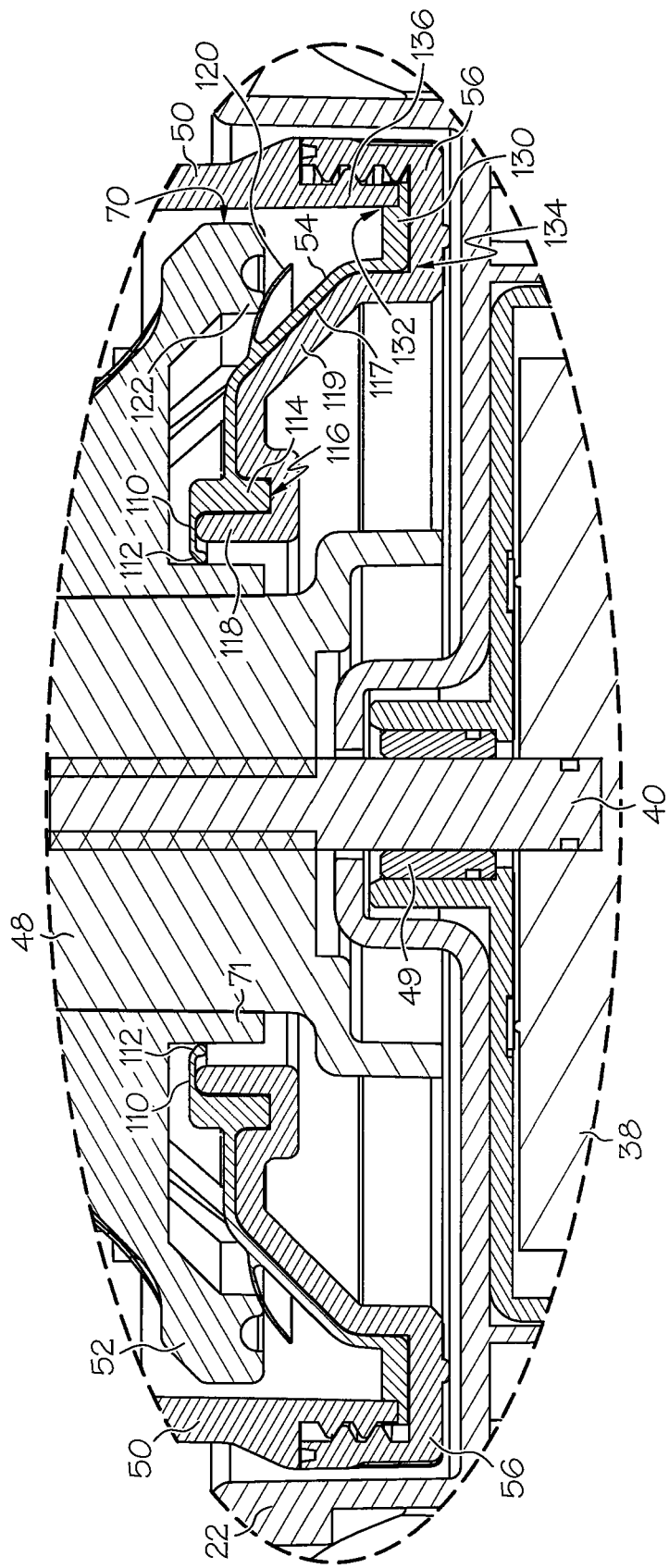
FIG. 13 shows detail view 13 of FIG. 3, rotated for clarity.

Turning now to FIG. 13, which shows detail view 13 of FIG. 3, the food homogenizer 20 further includes the sealing element 54 that is configured to provide a fluid-tight seal between the base 22 and the homogenizer assembly 24. More specifically, the sealing element 54 is configured to retain the blended/homogenized food within the homogenizing chamber 50 against internal pressures developed during operation, though still permits the food to be discharged via the exit spout 60. As shown in FIGS. 4 and 13, the sealing element 54 is disposed between the shredder 52 and the end cap 56. Additionally, the sealing element 54 is manufactured of a flexible, food-impermeable material such as rubber, silicone, etc. It is to be appreciated that the sealing element 54 has a very complex shape. Although the sealing element 54 is described herein as a single, monolithic seal that provides multiple sealing points, multiple seals could also be utilized. Moreover, while the sealing element 54 can have a uniform geometry when rotated about its central axis, it can also have a non-uniform geometry.

The sealing element 54 includes first sealing flange 110 abutting and circumscribing the socket 71 of the shredder 52 to provide a generally continuous seal between the socket 71 and the homogenizing chamber 50. As shown in FIG. 4, the first sealing flange 110 circumscribes the annular hole 64 extending through the sealing element 54. The socket 71 is at least partially insertable through the annular hole such that the first sealing flange 110 acts as a lip seal against the socket 71. Thus, the geometry of the hole 64 corresponds to the exterior geometry of the socket 71 of the shredder 52. In order to provide the lip seal with a tight fit, the cross-sectional area (i.e., diameter, as shown) of the hole is slightly less than the exterior, peripheral cross-sectional area (i.e., diameter, as shown) of the socket 71. Still, during operation the shredder 52 rotates relative to the stationary sealing element 54, and the lip seal provided by the first sealing flange 110 is resilient enough to accommodate this motion. Additionally, the first sealing flange 110 can include a raised lip 112 extending along the entire periphery thereof. The raised lip 112 can bound the entire periphery of the annular hole, such that the raised lip 112 abuts the socket 71 of the shredder 52 when the socket 71 is at least partially inserted through the annular hole 64 to provide a fluid-tight seal with reduced friction. Thus, when the shredder 52 rotates during operation, the exterior periphery of the socket 71 will rotate against the raised lip 112 to provide at least one fluid-tight seal between the base 22 and the homogenizer assembly 24.

Additionally, the sealing element 54 can include geometry that cooperates with the end cap 56, or even other portions of the homogenizer assembly 24, to facilitate registry of the sealing element 54. In one example, the sealing element 54 can include an annular ring seal 114 projecting upwards from an inner surface that is inserted into a corresponding annular recess 116 of the end cap 56. The annular ring seal 114 can be received into and sealingly engage the annular recess 116 with a relatively tight fit when the end cap 56 is coupled to the homogenizing chamber 50. Thus, seating the annular ring seal 114 within the annular recess 116 can provide proper registration and placement of the first sealing flange 110 relative to the socket 71 of the shredder 52. In addition or alternatively, a raised side edge 118 of the end cap 56 can provide a fulcrum or the like to support and/or control the resilient deflection of the first sealing flange 110 against the socket 71. The annular ring seal 114, annular recess 116, and raised side edge 118 can further cooperate to provide a labyrinth seal. In addition or alternatively, the sealing element 54 can include a sloped region 117 that closely follows the contour of a sloping wall 119 of the end cap 56.

The sealing element 54 can provide additional seal points. In one example, the sealing element 54 can include a second sealing flange 120 providing a generally continuous seal about an interface between the generally cylindrical base 70 of the shredder 52 and the end cap 56. The second sealing flange 120 can extend outward in a cantilevered fashion from the sloped region 117, and can be resiliently deflected and/or deformed. As shown in FIG. 13, the second sealing flange 120 is configured to contact and seal against the entire periphery of a bottom edge 122 of the generally cylindrical base 70. In the shown example, the location at which the second sealing flange 120 is coupled to the sloped region 117 is arranged vertically above the location of the bottom edge 122 when the shredder 52 is arranged within the homogenizing chamber 50. Thus, engagement of the bottom edge 122 with the second sealing flange 120 will cause resilient deflection/deformation of the second sealing flange 120 to provide a continuous seal about the entire periphery of the bottom edge 122. Still, during operation the shredder 52 rotates relative to the second sealing flange 120, and seal provided thereby is resilient enough to accommodate this motion. Thus, when the shredder 52 rotates during operation, the periphery of the bottom edge 122 will rotate against the resiliently deflected/deformed second sealing flange 120 to provide at least another fluid-tight seal between the base 22 and the homogenizer assembly 24.

In another example, the sealing element can further include a third sealing flange 130 providing a generally continuous seal about an interface 132 between the end cap 56 and the homogenizing chamber 50. As shown, the third sealing flange 130 can be relatively flat and received into a corresponding base annular recess 134 of the end cap 56 with a relatively tight fit. Thus, when the end cap 56 is screwed onto the bottom of the homogenizing chamber 50, the third sealing flange 130 is sandwich between an inner surface of the base annular recess 134 of the end cap 56 and a lower end wall 136 of the homogenizing chamber 50 to provide at least another fluid-tight seal between the base 22 and the homogenizer assembly 24.

Additionally, the end cap 56 can apply a compressive force against the third sealing flange 130 when the end cap 56 is coupled to the homogenizing chamber 50. For instance, the third sealing flange 130 may be compressed between the annular recess 134 and the lower end wall 136 of the homogenizing chamber 50. Similarly, assembly of the end cap onto the homogenizing chamber 50 can also apply a compressive force between the cantilevered second sealing flange 120 and the bottom edge 122 of the shredder 52.

The food based homogenizer 20 can include various other features. Turning back to FIGS. 3-4, the plunger 62 is configured to be at least partially received by the inlet chute 58. During operation, food to be blended/homogenized is inserted into an open end 140 of inlet chute 58, and the body 142 of the plunger 62 is then inserted into the open end 140 to press the food down the inlet chute 58 and into contact with the rotating shredder 52 via an inlet opening 145 into the homogenizing chamber 50. The plunger 62 has a continuous surface, and a relatively blunt, terminal face 144 located at one end of the body 142 is used to press the food downwards. Due to the relatively tight tolerances within the homogenizing chamber 50, the food generally resists entering the homogenizing chamber. As such, it is beneficial to have a relatively close tolerance between the plunger 62 and the inlet chute 58 to inhibit food from back-feeding upwards. For example, as shown in FIG. 3, the inlet chute 58 defines an inner cross-sectional area, and the plunger 62 comprises an elongate body having a cross-sectional area that substantially extends across the inner cross-sectional area of the inlet chute 58. Various cooperating cross-sectional geometries can be used. In one example, the inlet chute 58 has a generally circular cross-sectional area with a diameter, and the body of the plunger 62 has a similar generally circular cross-sectional area with a slightly larger diameter. Similarly, the cross-sectional geometry of the terminal face 144 can extend substantially across the inlet 145 of the homogenizing chamber 50.

Additionally, as discussed previously, the interface between the homogenizing chamber 50 and the shredder 52 is controlled in order to provide the desired resulting food consistency. To this end, it is beneficial to maintain a generally consistent interface across the terminal face 144 of the plunger 62 when fully inserted into the inlet chute 58. As described and shown in at least FIG. 7, the inner surface 67 of the homogenizing chamber 50 has a curved geometry (i.e., corresponding generally to the conical geometry of the shredder 52). The terminal face 144 of the plunger 62 also has a similarly curved geometry that cooperates with the inner surface 67 of the homogenizing chamber 50 to provide said generally consistent interface when the plunger 62 is fully inserted into the inlet chute 58. That is, the terminal face 144 of the plunger 62 can have a curved geometry that closes off the inlet opening 145 and generally matches the conical geometry of the inner surface 67. Due to the relatively complex geometry of a conical surface, the terminal face 144 can include a non-symmetrical geometry, along multiple axes, in order to correspond with the conical inner surface 67 of the homogenizing chamber 50. Still, because the plunger 62 is movable relative to the homogenizing chamber, it is to be appreciated that the distance D measured as between the terminal blade edge 77 and the terminal face 144 may be less than or greater than the aforedescribed 3 millimeters (i.e., see FIG. 10).

In addition or alternatively, the plunger 62 can further include an enlarged handle 146 distally located from the curved terminal face 144 that is configured to mate with the open end 140 of the inlet chute 58 to provide a stop. For example, the stop can limit insertion of the plunger 62 into the inlet chute 58. The enlarged handle 146 can be configured to abut an enlarged flange 148 disposed at the upper end of the inlet chute 58. In one example, the enlarged handle 146 can limit the plunger 62 to an insertion depth where the curved terminal face 144 cooperates with the homogenizing chamber 50 to provide the generally continuous inner surface 67 for the homogenizing chamber 50. Still, the enlarged handle 146 can limit the plunger 62 to various desired insertion depths.

In addition or alternatively, the open end 140 of the inlet chute 58 can include a non-symmetrical geometry, and the enlarged handle 146 can also include a non-symmetrical geometry that corresponds with said non-symmetrical geometry of the open end 140 of the inlet chute 58. For example, the corresponding non-symmetrical geometries can include curved, ramped, stepped, etc. geometries that can be used to properly align the plunger 62 with the inlet chute 58 such that the plunger 62 is arranged at the desired insertion depth. In another example, the corresponding non-symmetrical geometries can be used to properly align the plunger 62 with the inlet chute 58 such that the terminal face 144 cooperates with the inner surface 67 of the homogenizing chamber 50 to provide said generally consistent interface when the plunger 62 is fully inserted into the inlet chute 58.

The food based homogenizer 20 can include still other various additional features. In one example, turning back to FIG. 2, the homogenizer assembly 24 can be provided with an auxiliary inlet chute 150 (schematically illustrated) for feeding berries or other items in at the same time a major food product is being fed into the main inlet chute 58. For example, the main inlet chute 58 can be used for bananas, while the auxiliary inlet chute 150 is used to introduce other fruits, mix-ins and/or flavorings (e.g., simultaneously, sequentially, etc.). In addition or alternatively, the auxiliary inlet chute 150 can be provided with a liquid supply reservoir 156 for providing generally non-solid flavorings or additives (i.e., liquids, gels, slurries, etc.) to the homogenizing chamber 50.

The auxiliary inlet chute 150 can be similar to the main inlet chute 58, though can be relatively bigger or smaller. As shown, the auxiliary inlet chute 150 is separate from the main inlet chute 58 and can feed items into the homogenizing chamber 50 via an auxiliary inlet opening (not shown). The auxiliary inlet chute 150 can be provided with its own auxiliary plunger 152 that can similarly provide an enlarged handle 154 that is configured to mate with an open end of the auxiliary inlet chute 150 to provide a stop. The auxiliary inlet chute 150 can have a similar geometry, orientation, etc. as the main inlet chute 58 relative to the homogenizing chamber 50 to similarly feed items generally perpendicular to the blades 76, though could also be arranged at various other angles. The auxiliary inlet chute 150 can also have a terminal face (not shown) that has a similarly curved geometry that cooperates with the inner surface 67 of the homogenizing chamber 50 to provide said generally consistent interface when the auxiliary plunger 152 is fully inserted into the auxiliary inlet chute 150. The auxiliary inlet chute 150 could also be located variously about the homogenizing chamber 50. Although illustrated as a separate element, it is contemplated that the auxiliary inlet chute 150 could be coupled to or formed with the main inlet chute 58 for feeding items into the homogenizing chamber via the same inlet opening 145.

In yet another example additional feature, turning now to FIG. 3, the food based homogenizer 20 can include a leverage handle 160 (schematically illustrated) mechanically attached to the plunger 62 that can increase the force and/or pressure the plunger 62 puts down the inlet chute 58 so that the operator does not have to use as much of their own effort to push it down. The leverage handle 160 can be useful in commercial, high-speed, and/or high-volume environments. Thus, the leverage handle 160 can provide an increased mechanical advantage on the plunger 62. The leverage handle 160 can include a handle support 162 coupled to the base 22 at various locations. The leverage handle 160 can be movably coupled to the handle support 162 variously (e.g., rotatably, pivotally, slidingly, etc.) to provide the desired motion and/or mechanical advantage.

The leverage handle 160 can be mechanically coupled to the plunger 62 (e.g., about the enlarged handle 146) via a driving element 164. The driving element 164 can be directly coupled to the plunger 62, such that movement of the leverage handle 160 upwards or downwards also causes similar upwards or downwards movement of the plunger 62. Alternatively, the driving element 164 of the leverage handle 160 can only be indirectly coupled to the plunger 62 via an abutment-type interface such that only downwards movement of the leverage handle 160 causes movement of the plunger 62 (i.e., also downwards). In either case, the leverage handle 160 can be detachable from the plunger 62 to facilitate cleaning and/or maintenance. In addition or alternatively, the leverage handle 160 (or even an auxiliary handle, not shown) could even be adapted to work together with the auxiliary inlet chute 150 (e.g., simultaneously, independently, etc.). In still yet another example, the leverage handle 160 could be coupled to force generator, such as a powered motor (e.g., electric, hydraulic, pneumatic, etc.), for driving the plunger 62 upwards and/or downwards.

It will be understood that each of the elements described above, or two or more together, also may find a useful application in other types of constructions differing from the types described above.

While the invention has been illustrated and described as embodied in a frozen fruit-based dessert homogenizer, it is not intended to be limited to the details shown, since various modifications and structural changes may be made without departing in any way from the spirit or the present invention.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:
1. A food homogenizer including:
a base comprising a driving motor with a drive shaft; and
a homogenizer assembly including:
   a homogenizing chamber having a conic shape portion with an inner surface against which food is homogenized;
   a rotational support disposed within the homogenizing chamber; and
   a shredder disposed within the homogenizing chamber and driven by the driving motor for rotational movement about an axis within the homogenizing chamber, the shredder having a conic shape portion ending at a vertex and with the conic shape portion of the shredder corresponding to the conic shape portion of the homogenizing portion;
   the shredder being axially supported for rotation within the homogenizing chamber between the drive shaft and the rotational support, the rotational support being disposed within the homogenizing chamber at a closed axial end of the homogenizing chamber that is distal from the drive shaft for engagement with the vertex of the conic shape-shaped shredder.

2. The food homogenizer of claim 1, wherein the closed axial end of the homogenizing chamber prevents discharge of homogenized food from the homogenizing chamber to an outside environment.

3. The food homogenizer of claim 1, wherein the rotational support includes a concave socket.

4. The food homogenizer of claim 1, wherein the shredder includes a convex support.

5. The food homogenizer of claim 1, wherein one of the rotational support and the shredder includes a concave socket, and the other of the rotational support and the shredder includes a portion configured to interface with the socket.

6. The food homogenizer of claim 5, wherein the portion configured to interface with the socket is a convex, ball-shaped support.

7. The food homogenizer of claim 5, wherein the portion configured to interface with the socket extends and into and is received by the socket.

8. The food homogenizer of claim 5, wherein the one of the rotational support and the shredder that includes the concave socket has the concave socket formed therewith, and the other of the rotational support and the shredder that includes the portion configured to interface with the socket has the portion configured to interface with the socket formed therewith.

9. The food homogenizer of claim 5, wherein the one of the rotational support and the shredder that includes the concave socket has the concave socket formed therewith.

10. The food homogenizer of claim 9, wherein the one of the rotational support and the shredder that includes the concave socket are formed via molding.

11. The food homogenizer of claim 9, wherein the other of the rotational support and the shredder that includes the portion configured to interface with the socket has the portion configured to interface with the socket provided as a separate, coupled portion.

12. The food homogenizer of claim 11, wherein the separate, coupled portion is coupled by one of mechanical fasteners, adhesives and welding.

13. The food homogenizer of claim 1, wherein the shredder has a conic shape extending from a conic base to a conic vertex, and having a plurality of radial projections extending linearly in directions extending from the conic base toward the conic vertex for moving relative to an inner surface of the homogenizing chamber.

14. The food homogenizer of claim 13, wherein the plurality of radial projections includes a plurality of blades.

15. The food homogenizer of claim 14, wherein the blades are one of: formed together as a monolithic structure with the entirety of the shredder or separately secured members.

16. The food homogenizer of claim 13, wherein the projections are one of: formed together as a monolithic structure with the entirety of the shredder or separately secured members.

17. The food homogenizer of claim 1, wherein homogenizing chamber includes a conic shape portion with an inner surface against which food is homogenized, the homogenizer assembly includes an exit spout in direct fluid communication within the conic shape portion of the homogenizing chamber and extending transverse to the rotational axis of the shredder to permit direct discharge of homogenized food from the conic shape portion of the homogenizing chamber to an outside environment as the shredder rotationally moves within the conic shape portion of the homogenizing chamber.

18. The food homogenizer of claim 17, wherein the exit spout is the only exit spout in direct fluid communication within the conic shape portion of the homogenizing chamber.

19. The food homogenizer of claim 17, wherein the exit spout is non-axially aligned with the rotational axis of the shredder.

20. The food homogenizer of claim 17, wherein at least the homogenizing chamber and the exit spout are coupled together to form a monolithic structure.

* * * * *

UNITED STATES PATENT AND TRADEMARK OFFICE
CERTIFICATE OF CORRECTION

| | |
|---|---|
| PATENT NO. | : 8,973,855 B2 |
| APPLICATION NO. | : 14/136030 |
| DATED | : March 10, 2015 |
| INVENTOR(S) | : Brian Louis Machovina et al. |

It is certified that error appears in the above-identified patent and that said Letters Patent is hereby corrected as shown below:

In the Specification

Column 12, line 11, Please delete "ID" and insert --D--.

Signed and Sealed this
Twenty-first Day of July, 2015

Michelle K. Lee
*Director of the United States Patent and Trademark Office*